M. EIDE.
WEANER.
APPLICATION FILED FEB. 9, 1910.
975,680.
Patented Nov. 15, 1910.
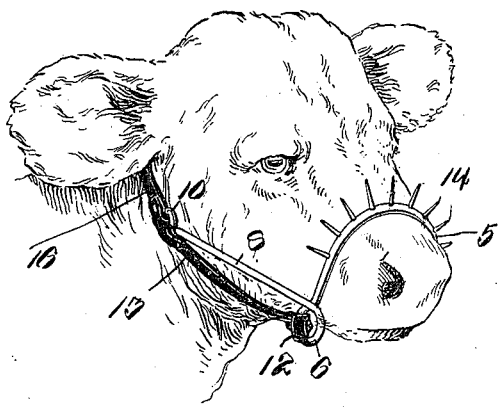
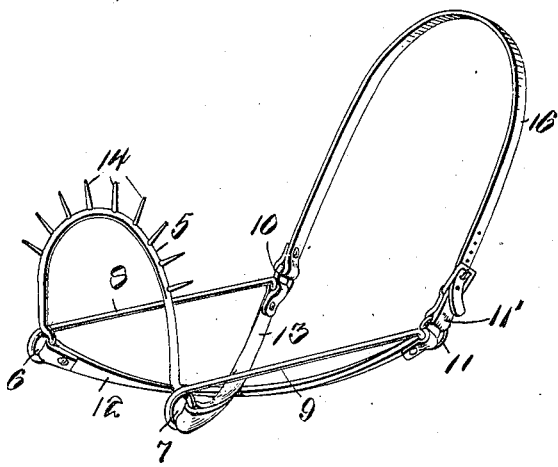
Inventor
Mathias Eide,
Witnesses
Gerald Hennesy
Henry T. Bright
By 
Attorneys

UNITED STATES PATENT OFFICE.

MATHIAS EIDE, OF CLINTON, MINNESOTA.

WEANER.

975,680.  Specification of Letters Patent.  Patented Nov. 15, 1910.

Application filed February 9, 1910. Serial No. 542,844.

*To all whom it may concern:*

Be it known that I, MATHIAS EIDE, a citizen of the United States, residing at Clinton, in the county of Bigstone, State of Minnesota, have invented certain new and useful Improvements in Weaners; and I do hereby declare the following to be a full, clear, and exact description of the invention, such as will enable others skilled in the art to which it appertains to make and use the same.

This invention relates to weaners for use upon colts, calves and other young animals.

The object of the invention is the production of a device of the character described which will be efficient in use, simple in construction and comparatively inexpensive to manufacture.

With the above and other objects in view the invention consists in the details of construction and in the arrangement and combination of parts to be hereinafter more fully described and particularly pointed out in the claim.

In describing the invention in detail reference will be had to the accompanying drawings in which like characters of reference denote corresponding parts in the several views; and in which, Figure 1 is a perspective view showing the invention applied to the head of a calf; and, Fig. 2, a perspective view of the invention detached.

Referring to the drawings, the invention is shown as formed in part of a single metal strand which is bent centrally to form an arch portion 5, the ends of said arch portion being each again bent to form the eyes 6 and 7 and then carried rearwardly at substantially right angles to said arch portion in the form of parallel arms 8 and 9, the free ends of which arms are also bent to form the eyes 10 and 11. A strap 12 has its terminals suspended in the eyes 6 and 11 while another strap 13 crosses said strap 12 diagonally and has its terminals suspended in the eyes 7 and 10; said straps 12 and 13 constituting what might be termed the chin straps for preventing the arched portion 5 of the device when applied to the animal from moving upwardly off of its nose. The arched portion 5 has projecting radially from the outer side thereof a series of prongs 14. A neck strap 16 adapted to be disposed around the animal's neck to the rear of its ear one terminal thereof being secured in the eye 10 and the other terminal to a buckle 11' mounted in the eye 11.

When the device is applied to the animal's head it will be apparent that the pronged arch 5 will be disposed in a position to accomplish the purpose for which it is intended, while the straps 12 and 13 serve to prevent both upward movement from and rearward movement on the animal's nose, while the neck strap 16 serves to secure the device as a whole in operative position.

What is claimed is:

The herein described animal weaner comprising a head piece formed with a vertical arch and a pair of parallel arms extending rearwardly from the ends of the arch, said arms having attaching devices at their front and rear ends and said arch having spurs, a neck strap having its ends attached to the attaching devices at the rear ends of said arms, and a pair of lower jaw straps, crossed and having their ends respectively connected to the attaching devices at the front and rear ends of said arms.

In testimony whereof, I affix my signature in presence of two witnesses.

MATHIAS EIDE.

Witnesses:
 F. S. HANSON,
 D. D. ROSS.